United States Patent [19]

Anderson et al.

[11] Patent Number: 4,515,132

[45] Date of Patent: May 7, 1985

[54] IONIZATION PROBE INTERFACE CIRCUIT WITH HIGH BIAS VOLTAGE SOURCE

[75] Inventors: Robert L. Anderson, Saline; William R. McDonald, Westland, both of Mich.

[73] Assignee: Ford Motor Company, Dearborn, Mich.

[21] Appl. No.: 564,280

[22] Filed: Dec. 22, 1983

[51] Int. Cl.³ .............................................. F02M 51/00
[52] U.S. Cl. .................................. 123/494; 324/460; 73/115; 73/35
[58] Field of Search ................... 123/494, 143 B, 425, 123/435; 73/35, 115, 116; 324/460, 464

[56] References Cited

U.S. PATENT DOCUMENTS

| | | |
|---|---|---|
| 4,265,205 | 5/1981 | Garcea ................................ 73/35 |
| 4,304,203 | 12/1981 | Garcea et al. . |
| 4,312,215 | 1/1982 | Dobler ................................ 73/115 |
| 4,345,154 | 8/1982 | Bainbridge . |
| 4,359,893 | 11/1982 | Kizler et al. ...................... 324/460 |
| 4,377,140 | 3/1983 | Latsch . |

FOREIGN PATENT DOCUMENTS 1512213  5/1978  United Kingdom .
2060062A 4/1981  United Kingdom .

Primary Examiner—P. S. Lall
Attorney, Agent, or Firm—Peter Abolins; Robert D. Sanborn

[57] ABSTRACT

The primary winding of an engine ignition coil is coupled to an ionization probe detecting cylinder combustion in order to apply a bias voltage.

1 Claim, 5 Drawing Figures

IONIZATION PROBE INTERFACE CIRCUIT WITH HIGH BIAS VOLTAGE SOURCE

BACKGROUND OF THE INVENTION

1. Field of the Invention

This invention relates to engine control systems using ionization probes as sensing elements.

2. Prior Art

It is known to control various engine operating parameters, such as composition of exhaust emissions, in accordance with the relative time of occurrence of the combustion chamber peak pressure and piston top dead center during the combustion process. One of the known methods of detecting combustion chamber pressure is using an ionization probe placed in the combustion chamber.

For example, U.S. Pat. No. 4,304,203 issued to Garcea et al; U.S. Pat. No. 4,377,140 issued to Latsch and British Pat. Nos. 1,512,213 and 2,060,062A teach the use of an ionization sensing probe to control the combustion cycle in an internal combustion engine. Closed loop control using an ionic current sensor to determine the end of the ignition phase of a combustible mixture in an internal combustion engine can be used to adapt ignition timing to compensate for conditions such as thermal status of the engine, characteristics of the fuel and of the combustion air, engine wear and so on.

U.S. Pat. No. 4,345,154 issued to Bainbridge teaches an ionization sensing device to detect harmful gases in a gaseous medium. To compensate for erratic changes in the electrical output signals of the sensing cell caused by variations in the flow of gas, a bias voltage, requiring a separate bias battery, is impressed upon the sensing device.

The ionization probe usually includes a metallic probe that is inserted through the cylinder wall and is electrically insulated from the metal cylinder block. When combustion occurs in the cylinder, a number of free ions are created in the flame front. The free ions in the flame front cause a current to flow and result in a decrease in the effective resistance between the probe and the cylinder walls. Typical resistance changes are from open circuit, indicating no combustion, to one to two megohms during combustion. The probe is used to measure time of arrival of the flame front relative to the spark event. The time of arrival data is used to determine the quality of the burn cycle.

Thus, the resistance of the ionization probe changes as a function of the occurrence of combustion and the application of a bias voltage to the ionization probe causes a change in the ionization probe current upon detection of combustion. Typically, applying a bias voltage to the ionization probe requires a high voltage power supply in addition to the vehicle battery. It would be desirable to eliminate this requirement. These are some of the problems this invention overcomes.

SUMMARY OF THE INVENTION

A vehicle engine ionization probe interface circuit means applies a bias voltage to an ionization probe by coupling the primary winding of the engine ignition coil to the ionization probe. Thus, the need for an additional battery is avoided by using the ignition coil primary winding as a voltage source to bias the ionization probe.

DETAILED DESCRIPTION OF THE INVENTION

Figure 1:
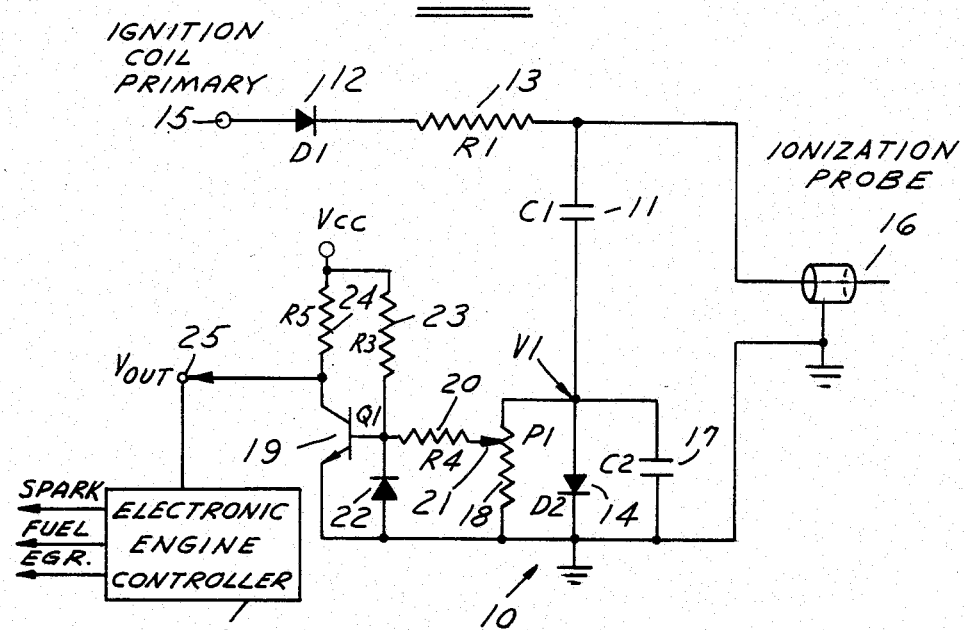
FIG. 1 is a schematic diagram of an ionization probe interface circuit in accordance with an embodiment of this invention.

Referring to FIG. 1, an ionization probe interface circuit 10 includes a capacitor 11 coupled in series with a diode 12, a resistor 13 and a diode 14 between an ignition coil primary winding 15 and a ground potential. The series combination of capacitor 11 and diode 14 is coupled in parallel with an ionization probe 16. A capacitor 17 is coupled in parallel with diode 14. A potentiometer resistance 18 is coupled in parallel with diode 14. A transistor 19 has a base coupled through a resistor 20 to a wiper 21 adjustably coupled to potentiometer resistance 18. A diode 22 is coupled between the base of transistor 19 and ground potential. The emitter of transistor 19 is coupled to ground potential. A resistor 23 is coupled between the base of transistor 19 and a voltage $V_{CC}$. Voltage $V_{CC}$ is typically 5 volts, but can be changed to accommodate other logic levels. A resistor 24 is coupled between the collector of transistor 19 and voltage $V_{CC}$. A logical output 25 is coupled to the collector of transistor 19 and applied to an electronic engine controller 26.

In operation, each 300 volt pulse that occurs at ignition coil primary winding 15 during a spark charges capacitor 11 to 300 volts. The ignition event occurs, and capacitor 11 is charged, just before combustion occurs. This places 300 volts DC across ionization probe 16. When cylinder combustion occurs adjacent ionization probe 16, ions are created and a current flows through probe 16. The current results in a partial discharge of capacitor 11 and a reverse voltage drop across potentiometer 18. The reverse voltage is indicated as V1 at a node between potentiometer 18 and capacitor 11 (see line 2C of FIG. 2).

Transistor 19 is normally turned on by means of a base current through resistor 23. When the voltage V1 becomes sufficiently negative to overcome the positive bias current through resistor 23 at the base of transistor 19, transistor 19 turns off. With transistor 19 off, the output voltage 25 at the collector of transistor 19 rises toward voltage $V_{CC}$.

Capacitor 11 is recharged by the next ignition event. During the recharging of capacitor 11, diode D2 is in forward conduction and voltage V1 at the node between diode 14 and capacitor 11 is clamped at about 0.6 volts. Transistor 19 is held in saturation preventing the possibility of false signals or noise.

Resistor 13 prevents the possibility of a shorted ionization probe 16 from shorting the ignition system primary winding. Diode 22 is reverse voltage protection for the base of transistor 19. The sensitivity of the circuit can be adjusted by moving wiper 21 on potentiometer 18. Capacitor 17 eliminates noise spikes due to the finite reverse recovery time of diode 14.

Figure 2:
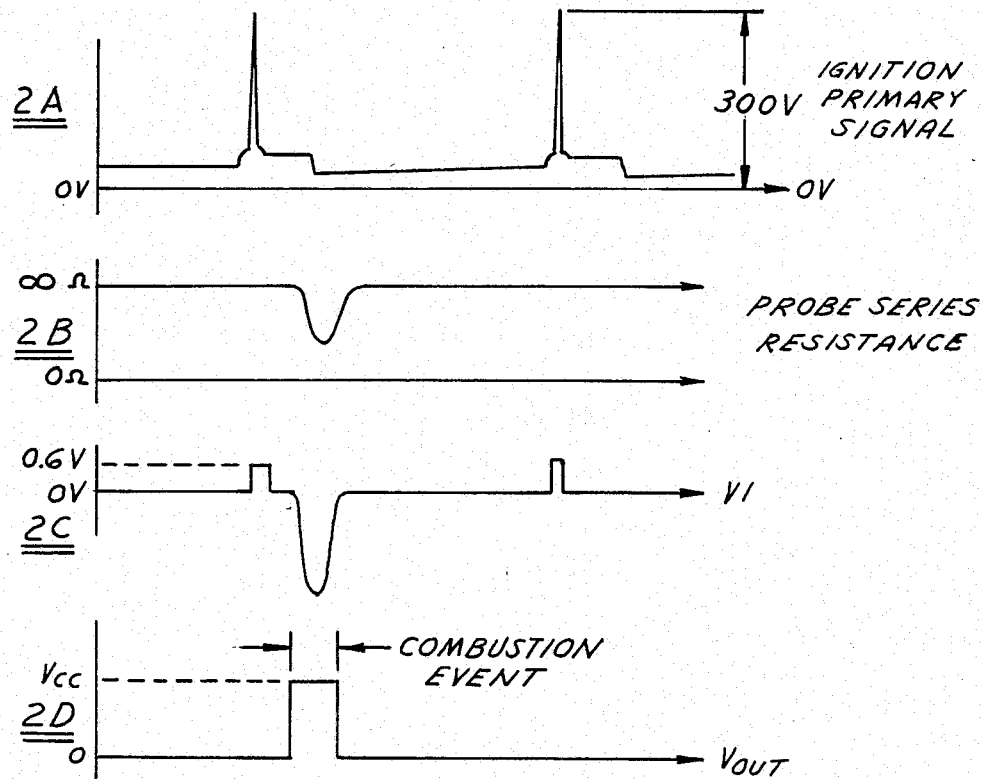
FIGS. 2A-2D are a plurality of waveforms with respect to time in accordance with an embodiment of this invention including the ignition primary voltage signal, the ionization probe resistance, the voltage at a capacitor coupled in parallel with the ionization probe, and the output voltage of a transistor coupled to the ionization probe.

Referring to FIG. 2, the waveforms indicating the operation of ionization probe interface circuit 10 are shown with respect to time. At line 2A, the ignition primary voltage is shown as having a sharp spike going from about 0 volts to about 300 volts upon each ignition event. At line 2B, ionization probe 16 series resistance is shown as being a very large, almost infinite, resistance magnitude during noncombustion, and then dipping sharply during a combustion event which follows in time shortly after the ignition primary voltage.

At line 2C, the voltage V1 at the node between diode 14 and capacitor 11 is shown. The voltage is at 0 volts but climbs to about 0.6 volts during charging of capacitor 11 at the occurrence of an ignition primary signal spike. The 0.6 volts is the voltage drop across diode 14 due to the current charging capacitor 11. When capacitor 11 is charged, voltage V1 drops to zero. Then, once the series resistance of ionization probe 16 drops, capacitor 11 starts to discharge causing a current through potentiometer 18 and a negative voltage during the combustion event at voltage V1.

If the ionization probe is in only one cylinder of a multi-cylinder engine, each ignition primary event which charges capacitor C1 will not have a corresponding discharge and therefore no drop in probe resistance or drop in voltage V1. Such a condition is indicated by the second ignition primary signal spike which does not cause a decrease in probe resistance and does not cause a drop in voltage V1 indicating a combustion event.

Line 2D indicates the output voltage of transistor 19. The output voltage is about 0 volts during conduction of transistor 19 and rises quickly to about $V_{CC}$ when transistor 19 is biased off. Such a bias turning transistor 19 off occurs when there is sufficient current flowing through potentiometer 18.

The change in collector output voltage 25 of transistor 19 from zero volts to $V_{CC}$ indicates combustion has occurred in the cylinder associated with ionization probe 16. The leading edge of the pulse indicates the arrival of the flame front at ionization probe 16. This information is transmitted to electronic engine controller 26 which can then adjust the engine ignition timing, air fuel ratio, exhaust gas recirculation (EGR) or other parameters to adjust the combustion timing to produce peak engine efficiency. The controller may be a combination of analog, digital, or microcomputer circuitry to produce the desired control.

Various modifications and variations will no doubt occur to those skilled in the arts to which this invention pertains. For example, the particular voltage magnitude applied to the transistor may be varied from that disclosed herein. These and all other variations which basically rely on the teachings through which this disclosure has advanced the art are properly considered within the scope of this invention.

We claim:
1. A vehicle engine ionization probe interface circuit means for detecting cylinder combustion in an engine having an ignition coil with a relatively high voltage primary winding and for applying a bias voltage to an ionization probe, said ionization probe interface circuit means including:

a coupling means for coupling the primary winding of the engine ignition coil to said ionization probe; said coupling means including a first capacitor connected in parallel with said ionization probe for charging in response to ignition coil primary current, a transistor coupled to said ionization probe to provide a logic level output voltage signal as a function of a resistance change in the ionization probe due to occurrence of cylinder combustion, and an engine control means coupled to said transistor for controlling engine operating parameters in response to the logic level output voltage signal;

said primary winding of the engine ignition coil being coupled to a series combination of said first capacitor and a first diode, said series combination of said first capacitor and said first diode being in parallel with said ionization probe, a potentiometer resistance coupled in parallel with said first diode, said transistor having a base adjustably coupled to said potentiometer resistance and said base being coupled through a bias resistor to a voltage source suitable for applying a base current to said resistor, and said engine control means being coupled to a collector of said transistor;

a second capacitor coupled in parallel with said first diode to substantially reduce noise spikes due to the reverse recovery time of said first diode;

a protection resistor coupled in series between the ignition coil primary winding and a node between said ionization probe and said first capacitor to provide protection against shorting out the ignition system primary winding if the ionization probe is shorted;

a second diode coupled between a ground potential and the base of said transistor to provide reverse voltage protection for the base of said transistor; and a third diode coupled in series between said protection resistance and the ignition coil primary winding, a load resistance coupled between the voltage source for applying the logic signal and the collector of said transistor, and a base resistor coupled between the base of said transistor and said potentiometer.

* * * * *